United States Patent [19]

Bishop et al.

[11] 3,730,018
[45] May 1, 1973

[54] TORQUE-BALANCED STEERING SYSTEM

[75] Inventors: Arthur E. Bishop; Richard E. Henrich, both of Barrington, Ill.

[73] Assignee: Arthur E. Bishop, Barrington, Ill.

[22] Filed: Jan. 29, 1970

[21] Appl. No.: 6,747

[52] U.S. Cl. .................................................74/498
[51] Int. Cl. ..............................................B62d 1/20
[58] Field of Search........................74/500, 498, 499; 91/380

[56] References Cited

UNITED STATES PATENTS

| | | | |
|---|---|---|---|
| 2,627,187 | 2/1953 | Davis | 91/380 X |
| 3,500,699 | 3/1970 | Matsuda | 74/498 |
| 3,505,899 | 4/1070 | Dye | 74/499 |
| 2,865,217 | 12/1958 | Bishop | 91/380 |
| 2,953,932 | 9/1960 | Lincoln | 74/499 X |
| 3,500,700 | 3/1970 | Matsuda | 74/498 |

*Primary Examiner*—Milton Kaufman
*Attorney*—Hill, Sherman, Meroni, Gross & Simpson

[57] ABSTRACT

An improved power steering system for automotive vehicles employing a compact integral gear box having a variable ratio steering output coupled with a torque-matching geared variable ratio interconnection between the steering output shaft and the source of power assist to provide substantially improved on-center turn rate capability, improved on-center feel, and increased torque availability in the parking range. Substantially increased steering system efficiency is provided while, at the same time, a low-cost gear construction is incorporated.

3 Claims, 15 Drawing Figures

Patented May 1, 1973  3,730,018

OUTPUT ANGLE

INVENTORS
Arthur E. Bishop
Richard E. Henrich

BY Kiel Sherman Meroni, Gross & Simpson
ATTORNEYS

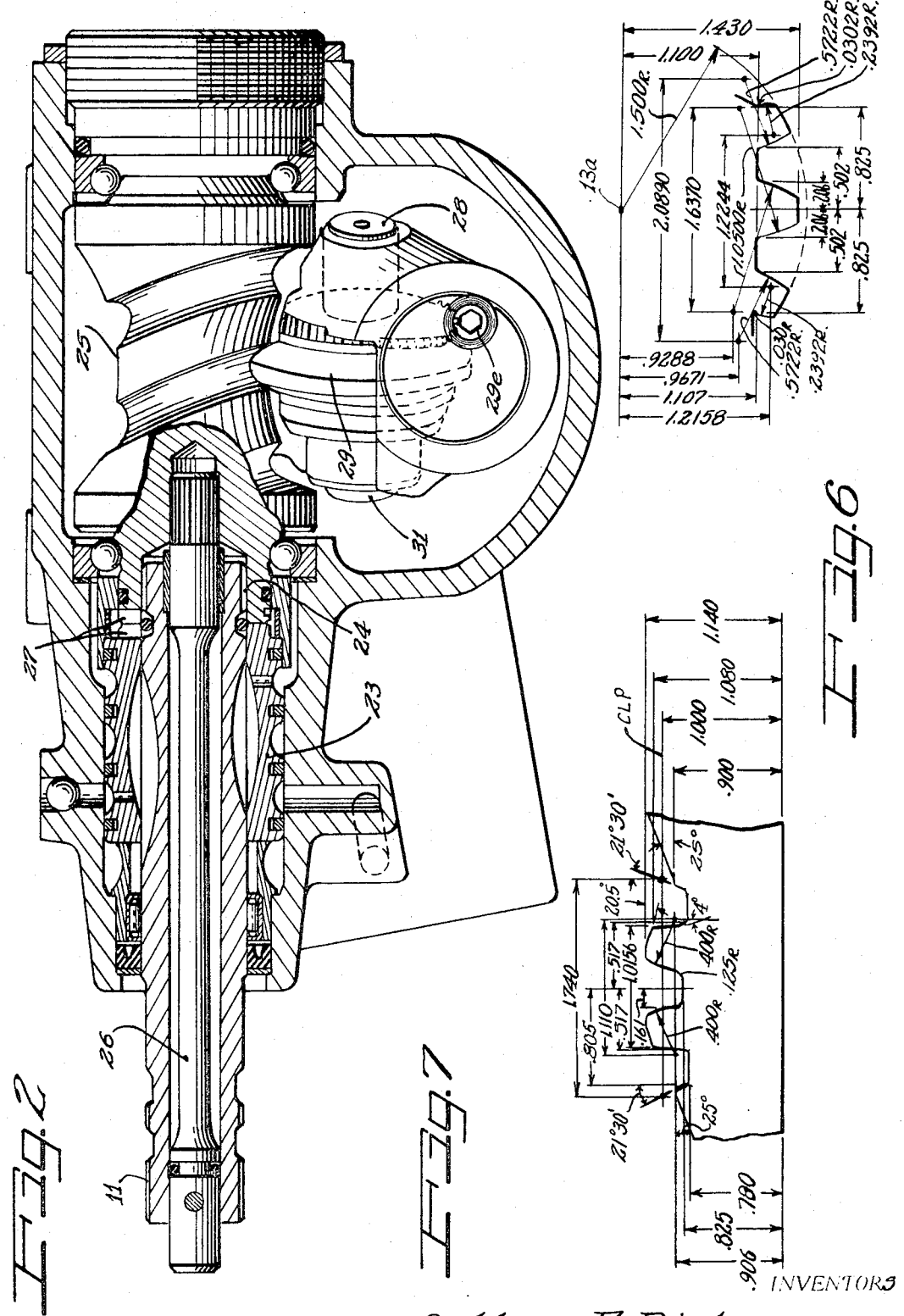

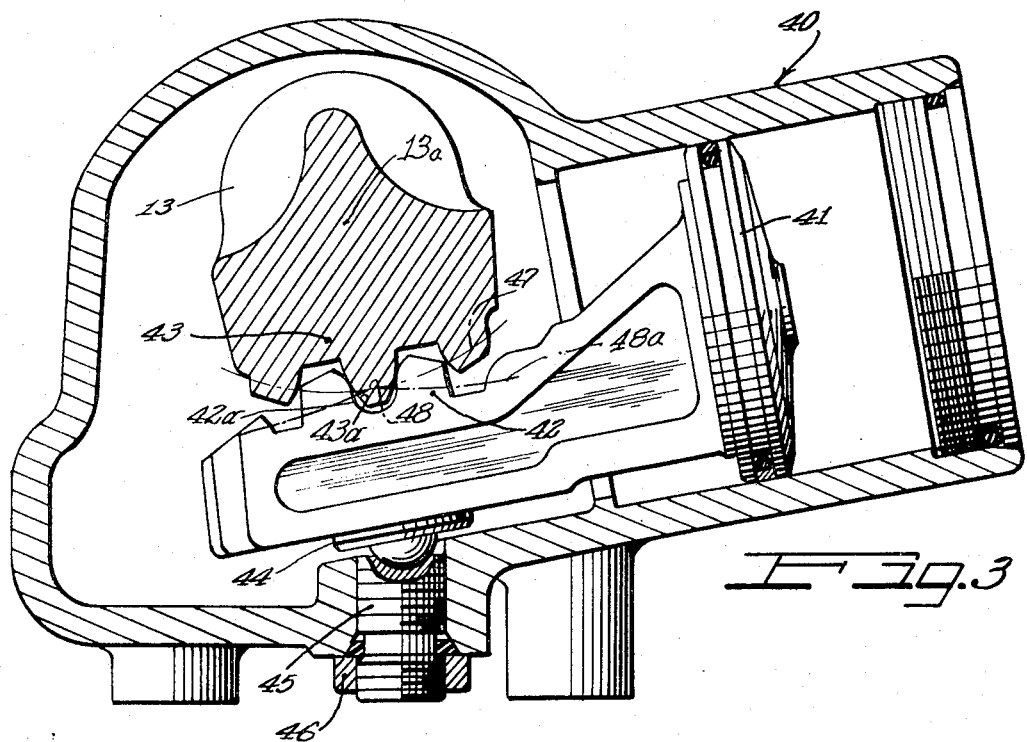
Fig.3
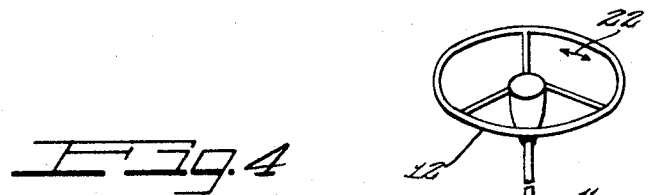
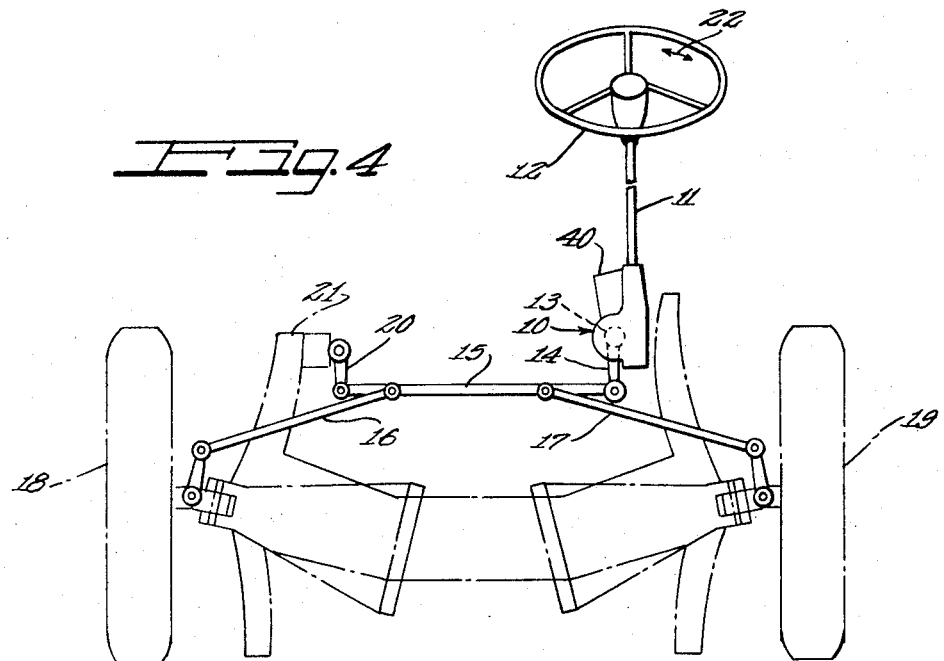
Fig.4
INVENTORS
Arthur E. Bishop
Richard E. Henrich
ATTORNEYS

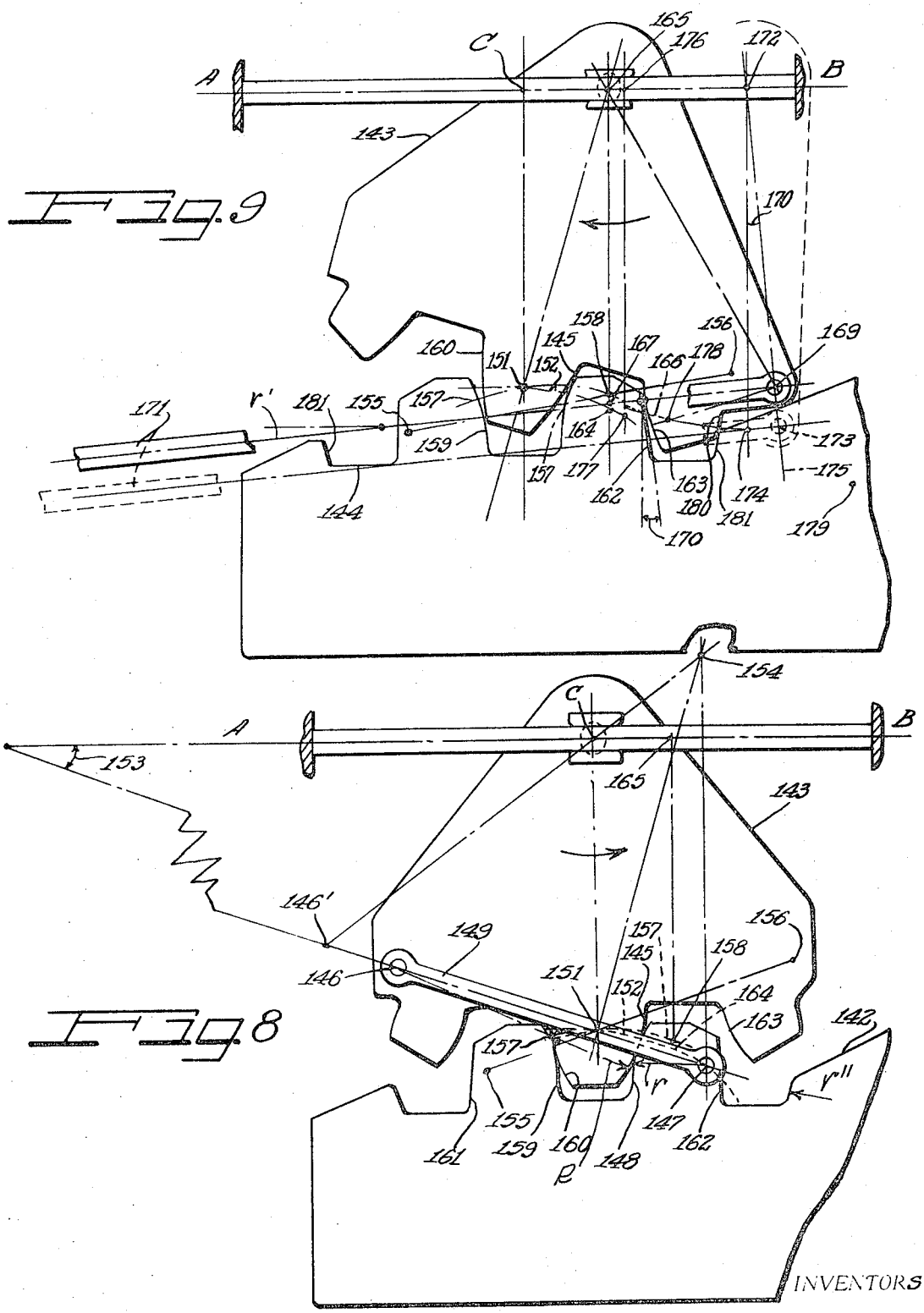

INVENTORS
Arthur E. Bishop
Richard E. Henrich

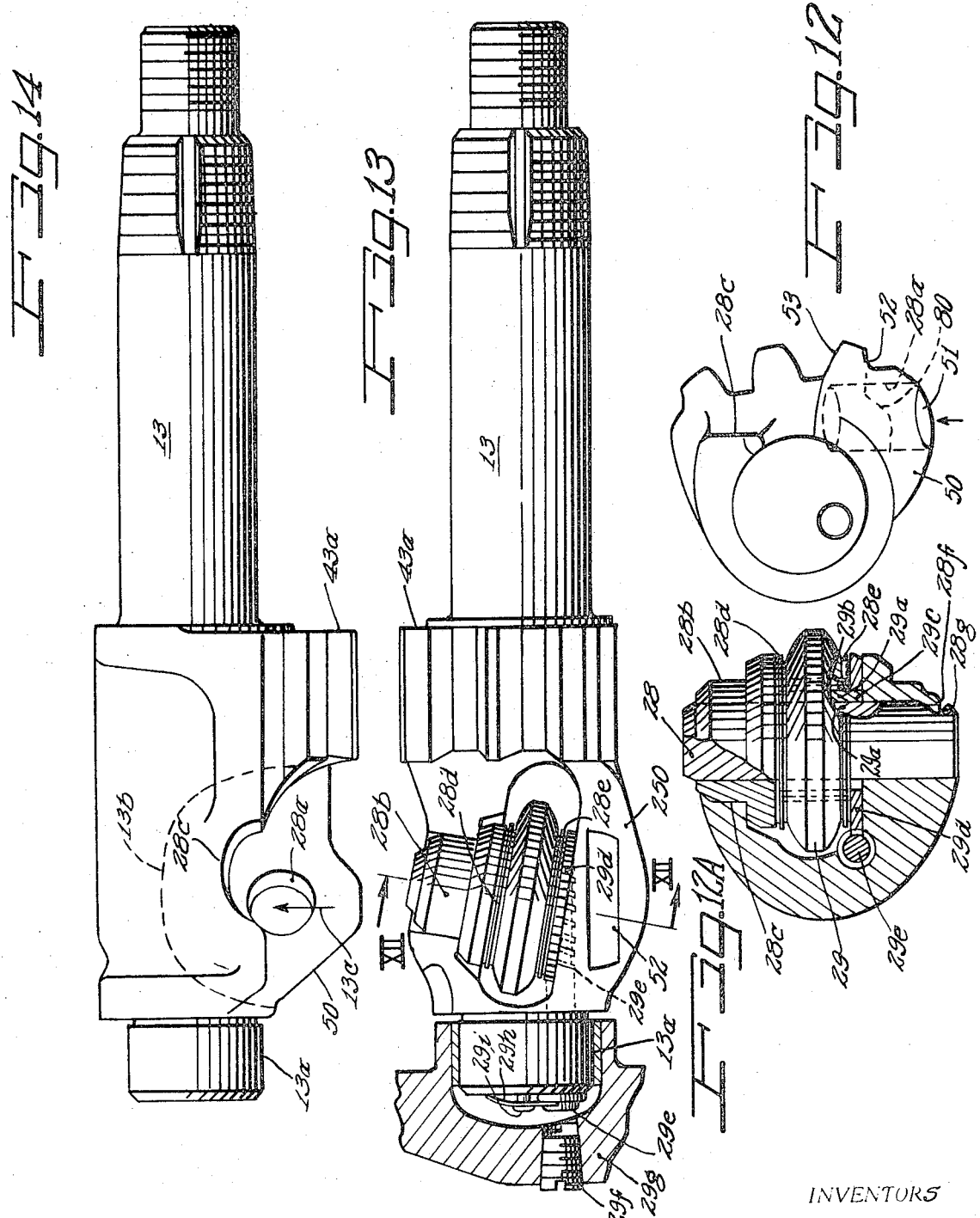

TORQUE-BALANCED STEERING SYSTEM

BACKGROUND OF THE INVENTION

As those familiar with the field of automotive steering are aware, improvements in vehicle handling have been accomplished in recent times through the incorporation of variable ratio steering. Examples of such systems include the prior U.S. Pat. Nos. 2,865,215; 2,865,216; and 2,865,217, issued to Arthur E. Bishop. Variable ratio systems in accordance with such patents provide a high, or less direct steering ratio in the on-center, or straight-ahead condition and provide a rapidly dropping ratio as the steering wheel is turned away from the centered condition, with a subsequent gradualization of the ratio drop to a lower ratio extending without appreciable ratio change as the vehicle wheels turn toward the locks, or extreme positions of turn. It is preferred that the application of power, by way of a hydraulic motor, for example, be provided on the output side of the steering gear variable ratio connection. Such systems have similarly been disclosed and claimed in the above-mentioned prior Bishop patents. In accordance with such patents, the power applied by a hydraulic steering motor, for example, is applied at a substantially uniform ratio.

It has been found important in maneuvering situations, that a maximum turn rate capability be provided adjacent the straight-ahead steering condition in order to prevent what is commonly termed "overtaking" the steering pump, with a resultant apparent failure of the steering system to respond. A satisfactory system for providing such requirements is employed in accordance with the present invention. Here, the hydraulic power steering motor is connected to the steered vehicle part through a connection providing substantially lower torque applied to steering motion at the center or in-line condition that at the vehicle locks. This combines with the variable ratio linkage of the steering to provide an arrangement in which less than usual power assist is provided in the on-center condition with improved on-center feel, but in which substantially more power is available as the steering system moves away from its on-center condition. This arrangement permits utilization of a smaller power steering pump and motor combination with a given steering design or, alternatively, provides a substantially increased torque availability for the vehicle operator with the same power motor and pump conventionally used.

In circumstances in which power failures occur, and, accordingly, manual steering must be accomplished, the more direct connection between the power steering motor and the steering output shaft, as envisaged in this invention, provides a reduced motor resistance load in the near-center areas. It is in these areas that typical pump failures occur and, accordingly, superior power-off operation is also provided by the instant invention.

SUMMARY OF THE INVENTION

In accordance with the present invention, a steering wheel shaft or steering input shaft is provided. In a preferred form, an hourglass worm is provided with a variable ratio cam track generally as described in the above-mentioned earlier Bishop U.S. Pat. No. 2,865,217. This cam track provides, in co-operation with a roller type cam follower carried by a cross-shaft, a high ratio on-center with a rapidly, and then less rapidly, decreasing ratio as the system moves away from its in-line condition. The cross-shaft is pivotally mounted generally transverse to the hourglass worm and is provided, in accordance with the present invention, with a cam gear having teeth with a pitch line of varying radius which increases in the away-from-centered condition. A rack having mating gear teeth cooperates with the cam gear on the cross-shaft to provide low friction contact therewith to oscillate the cam gear in response to the application of power to the rack from a power motor. The power output of the motor to the rack with the steering valve open is substantially constant throughout motor travel. The steering valve is mounted on the steering wheel shaft, or on the driver's side of the variable ratio steering linkage, and arranged to be affected only by input torque and not by the varying ratio, while the motor is drivingly connected to the cam gear on the steered wheel side of the variable ratio steering connection. The result of this cooperative assembly is a steering ratio of general indirectness in the on-center condition with a simultaneous improved road feel by application of a relatively lower maximum-available steering torque (but faster output shaft rotation, or higher turn rate capability) on center. These characteristics, coupled with improved power capability in the parking range, are highly desirable in a steering system and have not, heretofore, been provided in automotive vehicle steering.

In the embodiment illustrated, a novel, extremely compact system is provided. This is accomplished by special tooth forms on the sector gear of the cross-shaft, or sector shaft, and the provision of a one-eared support on the cross-shaft for the cam follower incorporating a novel mesh adjustment. The special sector tooth and cam follower support construction permits broaching the cross-shaft sector gear and also permits ample metal support for the roller in spite of its single-ended support. The resultant roller follower and variable ratio sector gear comprises a novel, extremely compact configuration for a power steering system.

DESCRIPTION OF THE DRAWINGS

FIG. 2 is a cross-sectional view taken along the line II—II of FIG. 1;

FIG. 3 is a cross-sectional view taken along the line III—III of FIG. 1;

FIG. 4 is a diagrammatic illustration of a conventional steering linkage showing the interrelationship of the steering parts to the dirigible wheels;

FIG. 6 is a detailed view, with dimensions in inches of a cross-shaft gear in accordance with an embodiment of the invention;

FIG. 7 is a detailed view of a power rack constructed for operation with the gear of FIG. 6;

FIG. 8 is a diagrammatic representation of the development of the gearing of the present invention shown in the on-center condition;

FIG. 9 is a diagrammatic representation of the gearing as shown in FIG. 8 with the parts advanced;

FIG. 12 is a comparative end view from above, of the sector shaft;

FIG. 12A is a cross-sectional view taken along line XII—XII of FIG. 13;

FIG. 13 is an elevational view of the sector shaft showing details of the one-eared configuration thereof; and FIG. 14 is a side view of the sector shaft only of FIG. 13 as viewed from the right in that figure.

DETAILED DESCRIPTION

Figure 1:
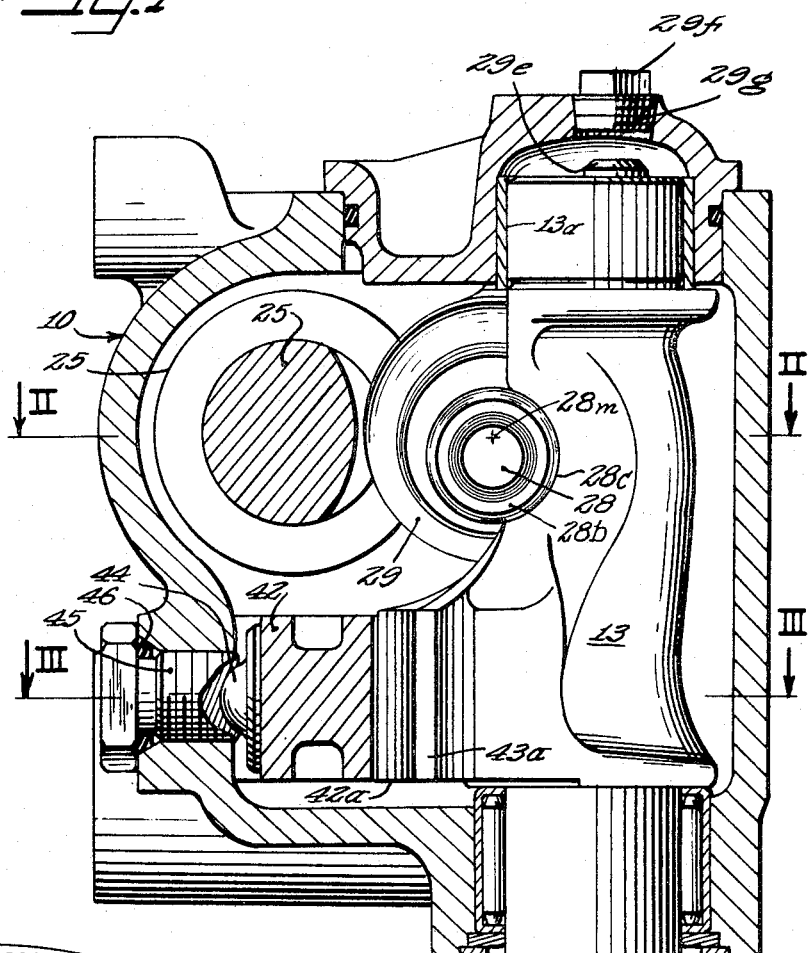
FIG. 1 is a side-elevational view, in partial cross-section, of a steering gear constructed in accordance with the present invention.

As can be seen from a consideration of FIG. 4, the invention of the present system is designed for utilization in an automotive steering system of any known configuration. An example, schematically illustrated, incorporates an integral steering gear 19 driven by a steering wheel shaft 11 connected to a steering wheel 12. The output from the steering gear 10 is applied to a cross shaft 13 which carries a pitman arm 14 connected to a steering linkage tie rod 15. The tie rod 15 is connected to steering arms 16, 17 of the respective dirigible wheels 18, 19. The tie rod is provided with an idler arm 20 pivotally secured to the vehicle frame 21. As thus described, the system is conventional in operation and general configuration. As a rotational input is applied to the steering wheel 12 as at 22, the cross shaft 13 oscillates reciprocating tie rod 15 and causing a turning action at the dirigible wheels 18, 19.

It has been found in the course of examining steering phenomena that the steering load requirements vary over the range of steering movement. Thus, it has been found that the torque required to turn the wheels increases as the wheels are increasingly turned. This increase is gradual at first with a more sharply rising increase as the wheels approach their maximum degree of turn and this torque requirement may be seen in the chart of FIG. 5 at line 30.

It will, of course, be apparent to those skilled in the art that the torque required to turn an automotive vehicle will depend on a number of factors, some of which are peculiar to a single, individual, automobile. One 1968 model automobile provided a torque required curve indicated at line 30 in FIG. 5 and this curve is considered typical. As may there be seen, a torque of slightly less than 8,000 inch-pounds is required to turn the wheels at the in-line condition, with the vehicle stationary and brakes applied. As the vehicle wheels are turned to a maximum approximating 35°, the torque requirement will have increased, as can be seen, to approximately 12,000 inch-pounds, again with the vehicle brakes applied. It may be noted that the torque required for steering operation with the vehicle brakes off, is somewhat less than the quoted amounts but it will also be noted that the brakes-off torque requirements increase in a manner generally similar to the curve 30, though slightly less rapidly.

In conventional power steering systems now being marketed, two power concepts are employed. The first of these is shown in the generally horizontal line 31 of FIG. 5 which may be termed a constant torque system, wherein the motor is constant torque and its output is substantially constant ratio. The size of motor and the output ratio is chosen to provide sufficient torque adjacent the locks with the steering valve full open. Substantially all power steering systems of the prior art have provided, or have been designed with the intention of providing such a substantially constant torque availability. In conventional systems the available torque is designed to be substantially constant at a value of approximately 10,000 inch-pounds and it will be observed that this availability is more than enough to operate the vehicle through turns up to and including approximately 30° of turn. Beyond that point, the torque available in the example illustrated, is below the torque required to provide continuing turn with brakes applied. In such a system, accordingly, a larger motor, or larger lever arm (pitch radius of driven output gear) would be required to provide proper power torque availability throughout the entire steering range. It will be seen, however, that in the centered, in-line condition, that the torque available is very substantially in excess of the torque required for turning, and, accordingly, it will be observed that the system is generally inefficient in providing more torque than necessary in the in-line condition and an insufficient amount of torque at the ends of turn.

Figure 5:
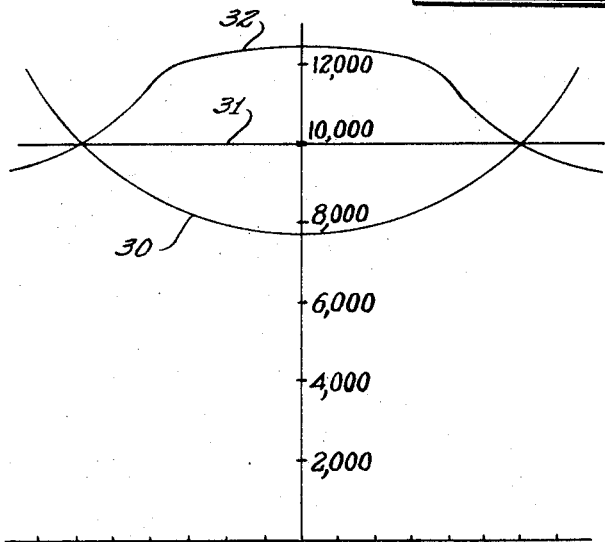
FIG. 5 is a chart graphically comparing vehicle steering torque requirements and torque available to meet those requirements.

A second form of power steering that is presently available on the market is shown in the line 32 of FIG. 5. This torque availability curve conforms generally to that marketed in power steering systems of General Motors' vehicles employing a variable ratio power steering system. In such systems, which generally utilize a reciprocal power steering motor coaxially aligned with a recirculating ball nut steering shaft, the motor output is applied on the steering wheel shaft side of the variable ratio steering gear. Such a system is illustrated in a general way in General Motors U.S. Pat. No. 2,953,932. In such a system the torque available is, in view of the ratio variation, substantially greater in the in-line condition while it drops to approximately the 10,000 inch-pounds figure adjacent the extremes of vehicle turn. Thus, again, the torque available is very substantially in excess of the torque required in the in-line condition and may very well be substantially less than that required at the extremes of vehicle turn. This redundant torque provides design disadvantages in that the steering linkage must be designed to withstand the unnecessarily high torque and, a substantially lower turn rate capability, or output velocity, is available in the on-center driving condition.

The present invention is designed to provide matched "torque-available" and "torque required" curves. The power motor connection to the output shaft is made in a variable ratio manner and in a manner providing a minimum of power loss in the transfer of power to the output shaft. In this manner the power available may be accurately tailored to the requirements of any given vehicle and thereby accomplish maximum efficiency of the power steering system with a minimum motor.

As shown in FIG. 1, the steering gear generally indicated at 10 has a cross-shaft or output shaft 13. The steering shaft 11 drives a worm 25 through a lost motion connection incorporating a torsion bar 26 and loose spline 24. The worm drives an open-center rotary steering valve sleeve 23 via drive connection 27. The steering connection comprising the shaft 11, the worm 25 and the lost motion connections 26,24 may be of any conventional form. It operates, upon rotation of the steering shaft 11, to oscillate the cross-shaft 13 by way of a cam follower roller 29 pivotally carried on support pin 28 mounted transversely of the axis of the cross-shaft 13. It is preferred that the worm 25 provide a variable ratio through the provision of a helical cam track of a variable pitch which provides for a relatively high steering ratio in the straight-ahead or in the in-line condition and a rapidly decreasing steering ratio as the vehicle is turned away from the in-line condition, with a gradually reducing change in ratio as the vehicle is progressively turned. The desirability of this feature in combination with the torque matching will be understood when it is recalled that with such a high ratio in the in-line condition, a relatively smaller amount of total torque is actually required at the steering wheel to provide turning of the vehicle wheels, particularly when the vehicle is moving fast. Thus, by providing torque matching construction with power torque availability at the in-line condition substantially lower than has been currently employed, more feel may be provided for the operator. Feel is, however, not excessive in situations wherein the torque demand is very high and the ratio is also very high, since with slight additional steering wheel torque, and hence valve deflection, sufficient power from the power motor is provided to accomplish the steering largely independent of the driver's input.

Power is applied in accordance with the present invention by way of a reciprocal output rack 42. The rack 42 cooperates with gear 43 integral with the cross-shaft 13 and is held in proper engagement therewith by a bearing block 44 adjustably carried by a screw 45 and lock nut 46. The gear teeth 43a and 42a are, as can be seen from FIG. 3, provided with a varying ratio. In the system shown, the pitch "circle" of the gear 43, shown at 47, has a minimum radius about the axis of rotation 13a of the shaft 13 at the center or in-line point 48 with an increasing radius as the pitch circle moves away from the in-line position. The pitch line of the gear teeth 42a of the rack 42 mates with the pitch line of the teeth 43a and, accordingly, as the rack 42 is reciprocated away from the in-line condition shown, the ratio of power application from the rack to the cross-shaft 13 increases at any given hydraulic pressure. Preferably, this increase is tailored to provide substantially the same torque availability with the conventional power steering valve fully open and the pump at full pressure, as the torque requirements 30 are for that individual automobile when it is stationary with the brakes applied. Not only does this assure sufficient torque at the outboard ends of vehicle movement, but, also it provides a substantially lesser torque in the in-line condition. This lesser torque has an important advantage in providing a substantially improved overtake or turn rate characteristic. In other words, when the motor 40 is providing relatively lower torque, it is doing so as a result of the fact that the piston 42, which travels at a constant speed with the valve fully open, moves less to provide a given degree of output rotation. Accordingly, relatively fast output shaft rotation is accomplished with a lesser piston movement, and, accordingly, response of the system is substantially faster, or the turn rate capability is increased in the lower torque conditions in and adjacent to the on-center condition. It is desirable that response be as fast as possible in and adjacent the straight-ahead condition and that the manual contribution be significant in order to improve avoidance maneuvering and on-center feel characteristics, respectively, and this is accomplished in accordance with the principles of the present invention through the torque matching above described.

Various models of automotive vehicles will have somewhat different steering characteristics and steering load and response requirements. Further, steering system is a sensitive area of vehicular operation. To provide complete torque matching, the transmission of torque through the system should be substantially independent of any wedging effects of the steering gear components at any given time. Many prior art systems of power steering have high friction losses in the power train and it is important, in accordance with the present invention, that such losses be minimized. Further, in view of the relatively individual characteristics of different makes and models of vehicle, it is desired that flexibility be provided in designing the variable ratio connection between the power cylinder 41 and the cross-shaft 13. These features are both achieved satisfactorily in accordance with the present invention. As shown in the drawings, the power motor is connected to the cross-shaft by way of a variable ratio gear connection in which the transmission of force is accomplished through a combination of sliding and rolling contact. This contact is achieved through gears 42 and 43. The gears 42 and 43 provide a satisfactory torque transmission system which may be varied through selection of various pitch line relationships, without changing any component parts other than the cross-shaft with its integral gear teeth and the power rack. Since torque requirement can readily be analyzed at the cross-shaft of any given vehicle model, the development of sufficient torque capability may readily also be developed at the same point and the appropriate variable pitch lines 47,48a and gear tooth forms developed.

In the detailed FIGS. 6–14, an embodiment of the novel gearing here used for power application is shown. There, the gear tooth configurations are illustrated as comprising a plurality of relatively simple surfaces. By limiting the surfaces to straight-line or to curved surfaces of fixed radius, the generation of the tooth form on a gear generator has been eliminated. Instead, the gear teeth on both parts can be broached, a technique that is relatively inexpensive from the point of view of both time and tooling cost. At the same time, a tooth construction is accomplished providing essentially no clearance in the straight-ahead condition with clearance increasing gradually to a substantially constant higher figure as the steering shaft is turned.

In FIGS. 6–14, suitable gears are shown. They can be broached so that when adjusted to give the desired zero clearance in the centered position, they will develop a controlled degree of clearance when turned to either side from centered position and maintain clearance all the way to the locks in a manner not readily accomplished with generated gears. Relative dimensions are shown in FIGS. 6 and 7 of the drawings where CLP is the centerline of piston 41 to illustrate construction of the gear. No complex curves are employed. Each of the curves comprises a simple radius and a broach passing parallel to the centerline will sequentially remove material without requiring rotation or oscillation of either of the gear parts or tools during cutting. Since the work path of the broach is a straight line, the width of the main or central tooth may be varied at will without in any way affecting the other teeth, a technique of construction not readily available in prior art gearing techniques.

For example, in considering prior art devices, the variable ratio rack and pinion teeth as used by General Motors and mentioned earlier, have substantial limitations. The tooth form employed in such prior art is extremely limited in the range of ratio patterns. The sharp junctions between changes in ratio as provided in the General Motors device are produced by the sudden changes in gearing relationship between the cutter and the pinion being cut in the gear generator employed. The variability of pitch radius must, in such situations, be built into the machine which cuts the sector, and also into the gauging equipment which is employed to check the pieces. This makes it difficult to use an arbitrary, smooth, curve in such prior art devices. It seems clear that prior workers in the field of power steering rack and pinion mechanisms have not recognized that involute and other classic gear forms which are inherently uniform in their velocity characteristics are illadapted to serve as a starting point for variable ratio configurations. In the variable ratio situation, it is desirable to have a generally increasing power ratio as the gear is turned from center, for reasons already noted; but it is also extremely important to provide precise meshing with a general tightness in the on-center condition gradually proceeding to increased mesh slack at either side of center with slight changes in relative velocity between the driver and driven members at points where contact changes from tooth to tooth. In accordance with this invention, non-generated gearing is initially devised which inherently produces the changing ratios while using relatively simple geometry still providing the requirements above noted. It is thus an important quality of these gears that they are geometrically simple and yet, as a result of careful proportioning, they meet the various complex requirements of this system.

According to this invention, the teeth are made with arcuate flanks so that any pair of engaging flanks controls the relationship between the rack and pinion as though they were connected by a crank mechanism. As is well known, the classic crank mechanism produces roughly harmonic motion between a reciprocating and rotating element of a velocity relationship which is constantly varying, and this relationship can be altered over a wide range by changing the proportions of the parts. These properties are used in gears made according to this invention by making successive teeth whose centers and radii are so chosen as to give a plot of velocity relationships which satisfies the foregoing gearing requirements. While the dimensions of a satisfactory structure have been illustrated in FIGS. 6 and 7, the derivation of such gearing may be more clearly understood from FIGS. 8 through 10.

As there graphically shown, the pinion or sector axis of rotation C has been considered as moving relative to a stationary rack member 142 along an axis A–B while sector 143 rotates about C clockwise. As long as the arcuate flank 145 of the sector 143 with a radius R about center 146 remains in contact with the arcuate flank 148 having a radius r about center 147, the distance 146–147 will remain constant and could be replaced by a rigid link such as illustrated at 149 as pivoted to the pinion at 146 and to the rack at 147. Sector 143 will rotate, as its pivot point C moves along axis A–B, at a velocity determined by the instantaneous center of rotation between it and the rack, which will be located where the line 146–147 intersects a line drawn perpendicular to the axis of the rack through center C, as at 151.

As the center C moves along axis A–B and is forced to pivot by the hypothetical link 149, the intersection point 151 with the normal through center C will travel in a curved path as shown in the dotted lines 152. It will be realized that in conventional involute gears, such a dotted line would comprise a straight line parallel to the axis A–B and would be termed the pitch line with a pitch radius of C–151.

The axis 146–147 of link 149 represents the line of action of the force between the teeth at their point of contact, and hence the angle between the axis 146–147 and the axis A-B, as shown at 153 corresponds to the pressure angle in conventional gearing. In the embodiment illustrated, an angle 153 of about 20° is shown. If the pressure angle and pitch radius C–151 are determined by ordinarily relevant design considerations, and are appropriate values, then within limits of the radii R,r these will will determine the path of the pitch line 152. Now, if R and r are so chosen that the normal to the link 149 at point 151 and the normal to axis A–B through point 147, and line 146–C extended meet at a point as at 154, the path of the pitch line 152 will cross the line C–151 exactly at right angles. That is, the rate of rotation of the pinion would be constant as C passes through center. This is not a desirable condition, and hence, in FIG. 8, point 146 (which should have been located at 146' for 146–C — 154 to comprise a straight line as above stated) is located closer to point 147 along link 149 by the distance 146—146'.

Up to this point, only the flanks 148, 145 of the rack and sector on the right side of FIG. 8 have been considered, and it is evident that in all normal steering where there is a tendency for the wheels to return to center through castoring, steering torque being supplied by the rack 142 to turn pinion 143 clockwise will cause contact to occur on the right side of the central sector of tooth and succeeding teeth, as shown. However, where turning is accomplished while stationary, or when traversing rough roads, there will be instants of load reversal which will bring the opposite flanks of the teeth into action, and it is important that there be only a limited degree of slack in the teeth. Such limited slack should approximate only a few thousandths of an inch. In the on-center condition, however, where the loads are symmetrical, there should be *no* slack and even more desirably, a slight degree of preload or interference-fit. Furthermore, as most of normal vehicle running occurs in the straight-ahead condition, wear will occur necessitating adjustment between the rack and pinion and there must be a minimal, small amount of slack away from center in the teeth to permit such a subsequent adjustment without then providing interference as the teeth move away from centered relationship. Tightness of the teeth away from center is highly undesirable as it would cause the steering gear to "hang up" or fail to readily return back to the centered condition after a turn.

Of course, in FIG. 8, the left side of the parts are a mirror image of the right side already described and a hypothetical link with an axis between points 155 and 156 will exist which would determine a pitch path 157 for contact between 159 and 160. In these circumstances, the lines 152 and 157 comprise mirror images about axis C-151.

Since it has been arranged so that the pitch lines 152 and 157 cross the centerline at some slight inclination to the normal C-151, they must diverge. This means that when the pinion rotates clockwise during normal steering controlled by contact on flank 145 on the right, and hence by the pitch line 152, it will rotate slower than if it were controlled by contact on flank 160 on the left, and hence pitch path 157. This means that slack must occur at one or the other flanks, generally on the unloaded side, or on the left in the case of FIG. 8. If the rack and pinion were indeed coupled by links 146-147 and 155-156, the latter link would have to "stretch" which, since the radii are fixed, could be equated to slack between the faces 159-160. The amount of slack for any given distance of travel from center will be generally indicated by the area between the curves 152 and 157, and hence the rate of divergence of these curves, or the rate of slack build-up, together with the generally "drooping" form of the curves can be controlled by choosing appropriate values of R,r angle 153 and the distance 146—146'.

As shown in FIG. 9, at some point 165 of the travel of pivot C of pinion 143 along the axis A-B, the useful limits of action of not normally active tooth flanks 159 and 160 will be reached, ordinarily, before this occurs for the active flanks 145 and 148. The pitch radius of the pinion will be 164-165 for the loaded direction and 158-165 for the non-loaded condition. The slack accumulation, represented by the area between the outgoing and returning curves in the detail view, FIG. 11, will have amounted to about 0.004 inch which is adequate to provide for wear and subsequent adjustment in the center condition.

In continuing the design, suitable properties must be selected for the flanks 162 and 163 to take over from flanks 159 and 160 for clockwise rotation and when contact is in the left side of the sector teeth such as when turning while stationary or when traversing rough roads and the sector momentarily drives the rack. In order to prevent a further accumulation of slack, the pitch line must lie close to the line 152 as, for example, line 166. It will be observed that the line 166 originates from point 167 directly under the pinion pivot position 165. The sudden increase of pitch radius 165-158 to 165-167 implies a sudden increase of velocity of the rack under reverse load conditions such as when the sector drives the rack, which means that the new contact will occur between flanks 162 and 163 at an appreciable relative velocity. This is important in order to give a well-defined exchange of contact or point of interchange. It will be appreciated that if the points 158 and 167 were nearly coincident, interchange would occur at a poorly defined point of pinion travel and hence a substantial amount of excess height of both the rack and pinion teeth would have to be provided, as is done in conventional gears in order to allow for pitch errors between contacting teeth.

In choosing coordinates for the centers of radius of the tooth flanks 162 and 163 it was decided that a very large radius was needed on flank 162 in order to give the desired form of the pitch line 166. In fact, r' was made infinite so that 162 is a straight line inclined at angle 170 to the normal to A-B and the hypothetical link 171 is then inclined at the same angle throughout its operation. The point of attachment of the link 171 to pinion 143 will therefore be at some point along the axis of link 171 which passes through the point 167, the selected radius at which interchange should occur. An appropriate radius R' is selected by trial and error to give the desired pitch path 166. As the pinion moves further along the axis A-B, as at point 172, pivot 169 of the pinion link 171 will move down the line 175 parallel to tooth flank 162 but at a distance R'. The pitch radius of the sector will again be at the intersection of the axis of link 171 and the normal through point 172, as at 174.

It will be noted from the above that the general form of the pitch path is that which will give increasing torque, at the sector shaft output, with movement away from center, as shown in FIG. 5 to be desirable. Following the interchange just described under reverse load conditions at sector travel 165, normally active flanks 145 and 148 reach their useful limit at some sector travel 176 and flanks 180 and 181 are then brought into action in a like manner to the earlier described interchange. As before, arcuate and linear forms are used with radius R" centered at 178 and r" being infinite. In this case a sudden increase in sector rate of rotation and hence a well-defined interchange. As the sector continues its travel from point 176 to the end position 172, its rotation is controlled, in the active direction, just as though by a link 184 of infinite length, as in the case of link 171. The pitch path will be derived as before, as indicated by the dotted line 182. A radius r" of finite length is acceptable also. The difference is slight since the range of contact between 180 and 181 is very short. In such case center 179 might be employed.

Figure 10:
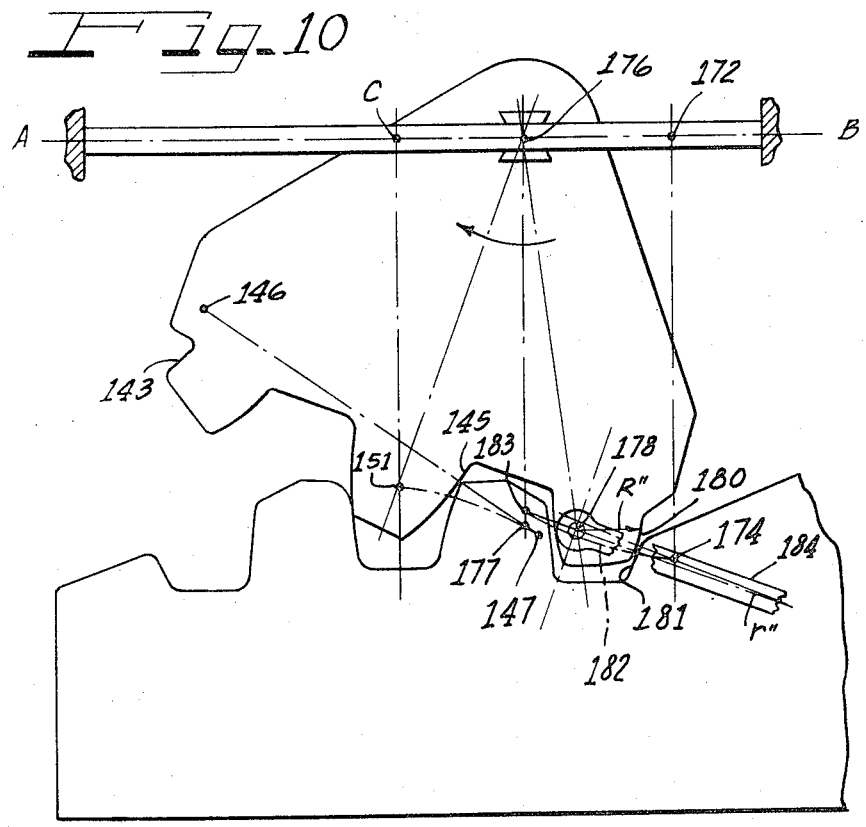
FIG. 10 is a diagrammatic representation of the gearing as shown in FIGS. 8 and 9, at a further position of advancement.

It will be observed that the tooth surfaces 180 and 181 are extremely short or truncated in the design of the invention illustrated, and that the radius of the root of the sector terminal teeth is relatively large. This is of great importance since it provides a large radius of sector material at the ends of the sector gear segment. Since, as explained below, the sector of the present invention is very compact and is preferably broached, it is important that a relatively large radius be provided at at least one end of sector travel to permit formation of an integral support for the worm follower located above the sector on the sector shaft. The truncation is possible in accordance with the present invention since a very small portion of the contact surfaces 180 and 181 are used. This is possible since the sector "overtravels" the rack as shown in FIG. 10 so that the same small portion of the contact surface 181 of the rack is employed twice as the sector approaches the ends of its turn. The contact line moves initially downwards as the sector pivot C moves toward the right from point 176. As the point C moves directly above point 178, a maximum downward movement is accomplished and a continued, or "overtravel," movement of the point C toward point 172 causes upward movement of the line of contact. Contact on the flank 181, which occurs where the centerline of link 184 crosses it, moves similarly down and up again on return, greatly conserving the length of flank needed, promoting compactness and conserving the required cross-shaft material. The extent of this saving can be seen from FIG. 12 in which the dotted line 80 approximates a conventional tooth form.

Figure 11:
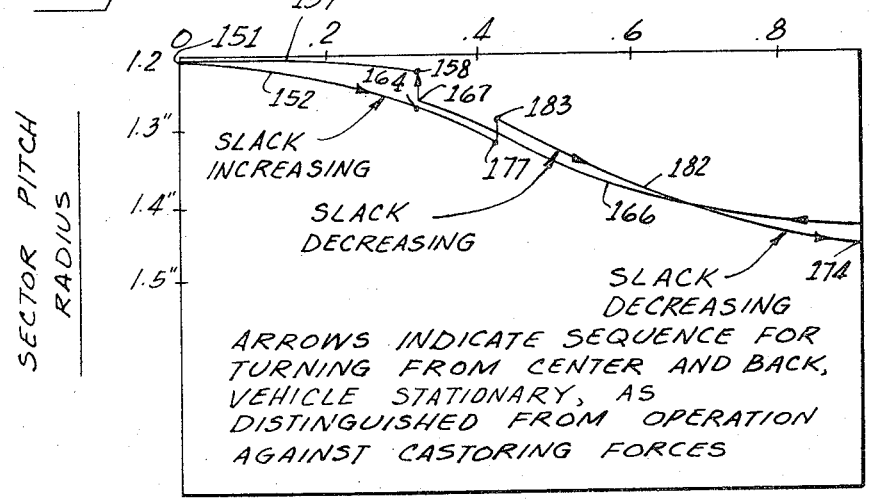
FIG. 11 is a chart representing the variations in pitch radius of a sector gear developed according to the present invention.

The pitch radius of the sector varies in accordance with the chart shown in FIG. 11 with the respective pitch lines being illustrated at 152,182. As is there shown, as the system moves away from the centered relationship, the effective pitch radius with the loads in the system on the right-hand flank 145 of sector 143, moves along the path 151,177,183,174 through the full travel of the rack which occurs at a point slightly in excess of 0.9 inch of rack travel in the embodiment illustrated. Upon reversal of the torque in direction of movement, in which the steering is turned in the other direction and the wheels tend to restore the vehicle in the straight-ahead condition, the contact is on the line 166,167,158,151. In each case, as the system moves backwardly in a direction opposite to the torque transfer provided in the turning direction, the area between the pitch lines in turning direction and pitch line in the returning direction comprises the instantaneous slack condition between the rack and sector as the parts assume a position away from the centered, no-slack relationship above described. Accordingly, the slack in the system has been very accurately controlled through the utilization of gear tooth surfaces having a constant radius tooth form rather than the involute tooth forms heretofore used.

An advantage that has been achieved by the construction of the gear teeth in a non-involute manner, and by utilization of arcuate surfaces of fixed radius, (including straight lines of infinite radius,) is that the surfaces may be broached or cut with cutters having a cutting edge conforming to the tooth shape. In a broaching operation the broaching tool has a cutting surface configuration at the final cutter substantially corresponding to the active contact surfaces of the gear teeth as formed in the manner described above. The broach is reciprocated parallel to the axis of the sector shaft 13 and, similarly, the broach employed for cutting the rack 42 is moved transversely of the longitudinal axis of the rack 42. The roughing cutters of the broach are substantially the same configuration as the final cutter but provide somewhat larger remaining tooth areas. As a result, the broaching tool may be sharpened after use, with the finalmost cutter being moved progressively toward the rough cutter end of the broach and a new final cutter supplied. In this manner, a maximum life is provided for the broach assembly and due to the simple curvature of the tooth forms, continual grinding of the broach is readily accomplished by a grinding wheel having a cross-sectional configuration identical to the final broach cutter. The avoidance of the complicated curvature of involute gear teeth has thus rendered the reciprocal broach a possible, a preferred, manufacturing technique. For the same reason, a rotary cutter or grinding wheel having the cutting surface conforming to the tooth form and axially or radially moved into the cross-shaft may be used.

As a result of the employment of a reciprocal broach technique for the construction of the gear teeth, it is important that no material of the sector shaft interfere with the passage of the broach axially of the sector shaft. In practice, this means that there can be no mass of metal on the sector shaft projecting beyond the root radius of the sector gear unless removal of some of the materials by the broach is not disadvantageous to the necessary strength of the sector shaft. It is extremely important to provide a compact system. The compactness of power steering systems is an increasing problem yearly as automotive engines become increasingly larger and hood heights become lower. The space remaining for such accessories as steering is reducing to the point where only extremely small steering systems, or those capable of being rendered extremely small, are acceptable for future construction. In the embodiment shown in FIG. 4, the power motor 40 is shown located substantially under the steering shaft 11 in a manner requiring the sector 43 to be substantially on the same side of the sector shaft as the worm 25. In the embodiment of the invention illustrated, the worm 25 is meshed with the cam follower 29 at the optimum point, substantially at the horizontal centerline thereof, while the sector 43a is in direct geared relationship with the rack 42. To provide compactness which is, as above explained, of the utmost importance in manufacturing inexpensively and in the utilization of steering systems in all manner of automotive vehicles, it is important that the maximum diameter of the cross-shaft be kept at a minimum, and that the axis of the power motor 40 be generally parallel to the axis of the steering shaft 11. To provide maximum compactness, a single-eared cross-shaft, or sector shaft provides support for the cam follower. This may clearly be seen in FIGS. 12, 13 and 14. As may there be seen, the cross-shaft 13 is provided with the gear teeth 43 and a single ear 50 having an axle aperture 28a drilled therethrough for accommodation of the cylindrical axle 28 shown clearly in FIG. 2. It is desired that the ear 50 comprise as great a mass of supporting metal as possible. At the same time, it is desired that the teeth 43 be capable of being machined by broaching as above described. This requires that the root radius of the teeth 43 in no case cut into the material of the cross-shaft 13 in a manner interfering significantly with the material of the ear 50. In the embodiment shown, the broach path actually cuts a small amount of material as at 52 from the ear 50.

The prior art steering cross-shaft designs have provided a number of difficult problems. In the main, hourglass worm-sector shaft roller follower combinations have been constructed by providing a pair of the ears supporting opposite ends of the cam follower roller axle. In the actual manufacture of such devices, the axle has been fixed in one or both of the ears by heating it to a workable state and peaning the axle into position while at the same time attempting to hold close tolerances between the ears which support the follower. This has not readily been accomplished and, as a result, the cost of hourglass worm configurations has been very high when extreme accuracy is specified. In variable ratio gearing, accuracy is extremely important in order to achieve no slack, particularly in the generally straight-ahead or on-center condition. If possible, it is desired that an interference-fit be provided in the on-center condition with a very gradual slack build-up, and it is important that this relationship be capable of being met not only when the gear is new but also over a period of time. Gearing constructed in accordance with the previous discussion has accomplished the desired compactness, the desired accuracy, and at the same time is capable of manufacture by a relatively inexpensive broaching technique.

A novel adjustment is also provided in accordance with the present invention whereby the extreme accuracy required can be maintained and the alignment of the hourglass worm and follower maintained at an optimum. As above noted, the midpoint 28m of the axle 28 is substantially on a line perpendicular to the axis of the cross-shaft 13 and passing through the axis of the hourglass worm. This is materially different from conventional prior art systems in which the roller cam follower axis is positioned approximately one-quarter inch above or below the axis of the hourglass worm and closer to the axis of the hourglass worm than desired under optimum conditions so that axial movement of the cross-shaft will cause a resultant in-and-out adjustment. However, such an adjustment is a substantial compromise to accuracy. In accordance with the present invention, adjustment of the cam follower is made toward and away from the axis of the worm by means of an eccentric upon which the cam follower roller is mounted. As can be seen from FIGS. 12a and 13, the roller 29 is rotatably carried about an eccentric sleeve 29a via needle bearings 29b. The eccentric sleeve 29a is splined by way of end projecting splines 29c to a worm wheel 29d rotatably carried by the axle 28 and driven by an adjusting worm member 29 e. Rotation of the adjusting member 29e will rotate the worm wheel 29d and in turn rotate the eccentric sleeve 29a causing a variation in position of the worm follower 29 toward and away from the axis of the hourglass worm 25 without significant shift axially along the cross-shaft. Adjustment worm 29e projects upwardly beyond the bearing 13a of the cross-shaft 13 as shown in FIGS. 1 and 2, and may readily be reached for adjustment by an external tool by removal of closure plug 29f in the power steering housing. Since worm and worm wheel drive systems are substantially irreversible, adjustment of the worm 29e will not be changed by loads on the follower 29. However, if desired, lock washers or any other detent device, such as spring 29i adjusted by screw 29h, may be employed with the worm 29e to maintain its position of adjustment.

The follower 29 is, as mentioned above, supported by axle 28 which is completely surrounded and carried by the single ear 50 having a bore 28 therethrough. In order to machine the pocket 13b extremely accurately, it is desired that a rotary cutter or grinder be sunk into the cross-shaft. For example, a rotary cutter having a shape similar to, but slightly larger than, roller 29 and rotating about an axis parallel to axis 28 is moved toward the cross-shaft in the direction of arrow 13c shown in FIG. 14. By eliminating the second ear of the cross-shaft, and providing in its place a semi-cylindrical recess 28c, the cutter, carried by its rotating drive shaft, may be moved into shaft 13 to full depth and the recess 13b, with all related bearing surfaces, may be finished precisely and inexpensively. Further, the removal of the ear avoids conflict with broaching when a reciprocal broach, rather than a radially moving tooth forming tool is used in manufacturing the sector teeth.

While elimination of the ear provides much improved manufacture, it does not appreciably affect strength of the steering system. In accordance with the present invention, a blushing 28b is provided in the semi-cylindrical recess 28c axially aligned with the bore 28a. The loads applied to the follower 29 by contact with the hourglass worm tend to act against the walls 28c and axially against the roller bearings 28d, 28e. Accordingly, sufficient strength is provided to eliminate any deflection of the axle 28 in operation while at the same time providing the ultimate compactness illustrated. In assembly, the axle 28 may be introduced from the open end of the bore 28a in the direction of the arrow shown in FIG. 12, with the roller 29 and its supporting components in position. Upon movement of the axle 28 into the position shown in FIGS. 12a and 13, the ear 50 may be staked as at 28f into a groove 28g in the axle 28, thereby preventing any axial shifting of the axle 28. By this means completely accurate positioning is provided without any heat, hot-forming or other operation which would possibly cause an error in alignment to occur. In order to eliminate slack, a slight preload on the axle 28 may be employed. By making the radius 28c approximately 0.001 inch smaller than the radius of bushing 28b while aligned with the axis of bore 28a, a snug fit is provided.

By the present invention, a variable ratio application of power to the steered wheels is provided in a novel manner that can be tailored to the variable load requirements and to the desired rate of turn. It will be noted by those skilled in the art that variations in construction and configuration may readily be made to conform the structure of the herein disclosed invention to various automotive frame and engine space configurations without departing from the novel concepts of the invention. Accordingly, it is intended that the invention be limited solely by the scope of the hereinafter appended claims.

We claim as our invention:

1. In combination in a power steering system having a steering input shaft drivingly connected to an input cam and a pivotal cross-shaft connection for operative connection to dirigible wheels via a steering linkage wherein a variation in torque is required to turn said wheels which increases as said cross-shaft rotates away from center, said cross-shaft having a cam follower in co-operation with said input cam, said cam and cam follower comprising a variable ratio connection having a high ratio on-center which rapidly and then less rapidly decreases to a substantially constant lower ratio, a power motor means drivingly connecting said power motor to said cross-shaft separately of said cam and pivotal cross-shaft connection comprising a variable ratio gear connection having a pitch line of varying radius providing a low ratio on-center and a higher ratio as the cross-shaft moves away from center substantially matching said torque requirement, the ratios of said connection and connecting means being non-additive, and said connection and connecting means driving said cross-shaft being in parallel.

2. In combination in a power steering system having a steering input shaft, first connection means drivingly connecting said input shaft to a pivotal cross-shaft for connection to dirigible wheels via a steering linkage wherein a variation in torque is required to turn said wheels which increases as said cross-shaft rotates away from center, a power motor, second connection means separate from, and in parallel with, said first connection means drivingly connecting said power motor to said cross-shaft, said second connection means comprising a variable ratio gear connection having a pitch line of varying radius providing a low ratio on-center and a higher ratio as the cross-shaft moves away from center, the ratios of said first connection means and said second connection means being non-additive.

3. In combination in a power steering system having a steering input shaft, first connection means drivingly connecting said input shaft to a pivotal cross-shaft for connection to dirigible wheels via a steering linkage wherein a variation in torque is required to turn said wheels which increases as said cross-shaft rotates away from center, said first connection means comprising a variable ratio connection having a high ratio on-center with a decreasing ratio with movement away from center, a power motor, second connection means separate from, and in parallel with, said first connection means drivingly connecting said power means to said cross-shaft and comprising a variable ratio gear connection having a pitch line of varying radius providing a low ratio on-center and a higher ratio as the cross-shaft moves away from center, the variable ratios being non-additive.

* * * * *